(12) United States Patent
Nemoto et al.

(10) Patent No.: US 11,457,192 B2
(45) Date of Patent: Sep. 27, 2022

(54) DIGITAL EVIDENCE MANAGEMENT METHOD AND DIGITAL EVIDENCE MANAGEMENT SYSTEM

(71) Applicant: Hitachi, Ltd., Tokyo (JP)

(72) Inventors: Naokazu Nemoto, Tokyo (JP); Hiroto Nagayoshi, Tokyo (JP); Takuma Terada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 44 days.

(21) Appl. No.: 17/277,405

(22) PCT Filed: Sep. 4, 2019

(86) PCT No.: PCT/JP2019/034822
§ 371 (c)(1),
(2) Date: Mar. 18, 2021

(87) PCT Pub. No.: WO2020/188854
PCT Pub. Date: Sep. 24, 2020

(65) Prior Publication Data
US 2022/0038671 A1 Feb. 3, 2022

(30) Foreign Application Priority Data
Mar. 15, 2019 (JP) .............................. JP2019-048874

(51) Int. Cl.
*H04N 9/804* (2006.01)
*H04N 19/176* (2014.01)
*H04N 5/232* (2006.01)
*H04N 5/77* (2006.01)

(52) U.S. Cl.
CPC ........... *H04N 9/8042* (2013.01); *H04N 5/232* (2013.01); *H04N 5/77* (2013.01); *H04N 19/176* (2014.11)

(58) Field of Classification Search
CPC .... H04N 9/8042; H04N 19/176; H04N 5/232; H04N 5/77
See application file for complete search history.

(56) References Cited

U.S. PATENT DOCUMENTS

| | | | |
|---|---|---|---|
| 2014/0361905 A1* | 12/2014 | Sadasivam | H04M 1/72454 340/870.01 |
| 2017/0364747 A1* | 12/2017 | Ekambaram | G06V 20/20 |
| 2018/0285234 A1* | 10/2018 | Degaonkar | G06F 11/0709 |

FOREIGN PATENT DOCUMENTS

| | | |
|---|---|---|
| JP | 2011243156 A | 12/2011 |
| JP | 2015064751 A | 4/2015 |

OTHER PUBLICATIONS

International Search Report of PCT/JP2019/034822 dated Oct. 8, 2019.

* cited by examiner

*Primary Examiner* — Sunghyoun Park
(74) *Attorney, Agent, or Firm* — Mattingly & Malur, PC

(57) ABSTRACT

A digital evidence management system 1 is configured to comprise a storage device that stores log data of a device operated in a predetermined process and video data obtained by shooting the process, and a computing device that executes a processing of specifying sectional video data for a time frame where the log data exists out of the video data, a processing of applying a predetermined data reduction processing to the sectional video data, and a processing of storing the video data subjected to the data reduction processing for the sectional video data in the storage device as digital evidence for the process.

14 Claims, 15 Drawing Sheets

DEVICE LOG

| 312 | 41 | 42 | 43 | 44 | 45 | 46 |
|---|---|---|---|---|---|---|
| TASK GROUP | TASK ID | PROCESS ID | DEVICE ID | LOCATION | LOG DATA | ACQUISITION DATE/TIME |
| workgroup_A-Z1 | work_A-01_0001 | 1 | 1 | Factory A-1 | ****.dat | 20180101-13:10:00-13:20:00 |
| | | | 2 | Factory A-1 | ****.dat | 20180101-13:20:00-13:25:00 |
| | | ... | ... | | ... | ... |
| ... | ... | ... | ... | | ... | ... |

FIG. 6

ORIGINAL VIDEO DATA MANAGEMENT TABLE

| ORIGINAL VIDEO DATA ID | FILE PATH | FILE FORMAT | SHOOTING LOCATION | START TIME | END TIME |
|---|---|---|---|---|---|
| org_video_0001 | /original_video/01/ | mp4 | Factory A-1 | 20180101-13:10:00 | 20180101-13:20:00 |
| .. | .. | .. | .. | .. | .. |

EVIDENCE VIDEO DATA MANAGEMENT TABLE

| EVIDENCE VIDEO DATA ID | ORIGINAL VIDEO DATA ID | FILE PATH | FILE FORMAT | START TIME | END TIME |
|---|---|---|---|---|---|
| evidence_video_A-01_0001 | org_video_0001 | /evidence_video/A-01/ | mp4 | 20180101-13:10:30 | 20180101-13:12:00 |
| .. | .. | .. | .. | .. | .. |

EVIDENCE TASK MANAGEMENT TABLE

| 701 TASK ID | 702 TASK GROUP | 703 EVIDENCE VIDEO DATA ID | 704 MAN | 705 MACHINE | 706 METHOD | 707 MATERIAL (INPUT) | 708 MATERIAL (OUTPUT) | 709 WORK LOCATION | 710 TASK START TIME | 711 TASK END TIME |
|---|---|---|---|---|---|---|---|---|---|---|
| work_A-01_0001 | workgroup_A-Z1 | evidence_video_A-01_0001 | Man_A | compressor | compress | MI_1 | MO_1 | Factory A-1 | 20180101-13:10:30 | 20180101-13:12:00 |
| ... | ... | ... | ... | ... | ... | ... | ... | ... | ... | ... |

NON-WORK VIDEO DATA HANDLING RULE

| TASK GROUP | TASK ID | HANDLING RULE |
|---|---|---|
| workgroup_A-Z1 | work_A-01_0001 | delete |
| ... | ... | ... |

FIG. 10

WORK UNIT VIDEO DATA HANDLING LEVEL

| TASK GROUP | TASK ID | HANDLING LEVEL | HANDLING CONTENT |
|---|---|---|---|
| workgroup_A-Z1 | work_A-01_0001 | low | documentation |
| ... | ... | ... | ... |

FIG. 11

DIGITAL EVIDENCE MANAGEMENT METHOD AND DIGITAL EVIDENCE MANAGEMENT SYSTEM

FIELD OF THE INVENTION

The present invention relates to a digital evidence management method and a digital evidence management method.

BACKGROUND OF THE INVENTION

With the spread of IoT (Internet Of Things), a variety of and a large amount of data are distributed, and many companies are providing services using these data. The spread of IoT also has permeated into each process of the supply chain, such as raw material procurement, manufacturing, and distribution.

Among them, by introducing various IoT-enabled devices in the manufacturing process, various types of information accompanied by the manufacturing can be obtained. In addition, by utilizing the information obtained in this manner, for example, it is expected to improve production efficiency in the manufacturing process.

By the way, the current supply chain is built not only in one country but also in a global environment in many cases. For example, each of a plurality of parts included in a mobile phone to be produced is manufactured from respective raw materials at factories in various countries. In addition, these parts are transported to a mobile phone manufacturer by a supplier in a certain country, and the mobile phone as a final product is manufactured through various processes.

As described above, each business operator included in the current supply chain is a person who conducts business activities in various countries. Therefore, products are manufactured in a very complicated environment across countries.

Meanwhile, recently, cyber security policies covering the entire supply chain are being sought in each country represented by the United States and Europe.

There are many cases where products manufactured in the supply chain (global supply chain) built in the global environment described above are used in the fields such as critical infrastructure or defense. In this case, if a problem is found in a specific process of the supply chain, a large impact may spread across the countries.

For this reason, in the United States or Europe, suppliers included in the supply chain are required to apply cyber security policies that satisfy a predetermined security requirement. As one of the policies, a system for certifying that the target product or service has been made in a form satisfying predetermined requirements in each process of the global supply chain becomes necessary.

For example, there is known a system that guarantees manufacturing quality or determines whether or not the target device or service satisfies the requirements on the basis of the data (log) obtained from the IoT device in the manufacturing process.

However, the manufacturing process includes not only processes performed by the IoT device but also processes that rely on human resources. In such processes that rely on human resources, so-called operation unsuitability occurs, which also results in a case where the quality of the target product is not guaranteed, and is connected to a large-scale recall.

Therefore, in order to guarantee the operation suitability in the manual manufacturing process as a system, it is conceived that the suitability is determined by recognizing a person's movement using various sensors or the like. Note that the data obtained by the sensors is collectively called "digital evidence".

As one piece of the aforementioned digital evidence, there is known video data obtained by shooting operations with a camera. As a related art relating to the processing of such video data, for example, an image management device or the like has been proposed (see Patent Document 1), in which a predetermined observation target is shot, and a first-person video in which an observation point and an average viewpoint position are changed intermittently is divided into sections. The image management device has a detection unit that detects a local characteristic amount from each frame of the first-person video and compares it with the local characteristic amount extracted from a registered image obtained by shooting the predetermined observation target at a predetermined arrangement to calculate a measurement amount relating to the observation and the viewpoint in each frame, and an indexing unit that performs clustering on the basis of the measurement amount relating to the observation and the viewpoint calculated as described above and indexing each frame depending on a result of the clustering to divide the first-person video into sections depending on each index.

A video conversion device or the like connected to an image database via a communication network has also been proposed (see Patent Document 2), which has a section dividing unit that divides the input video into video sections using a predetermined division method, a section classification unit that classifies each video section into a limited number of categories, a representative frame creating unit that creates one or more representative frames within each video section on the basis of a representative frame creation rule defined for each category, an alternative frame selection unit that selects an image of the image database similar to the representative frame as an alternative frame on the basis of images accumulated in the image database and similarity to the representative frame, a complementary information creating unit that creates complementary information for complementing the image frames other than alternative frame for each of the video sections on the basis of a complementary rule defined for each category and the alternative frame, and a document data output unit that creates and outputs document data containing an image reference value of the alternative frame, the complementary information of the image frame, the category of the corresponding video section, and a reproduction timing of the video section.

CITATION LIST

Patent Literature

PTL 1: Japanese Patent Application Laid-open Publication No. 2015-64751
PTL 2: Japanese Patent Application Laid-open Publication No. 2011-243156

SUMMARY OF THE INVENTION

However, the aforementioned video data has a large data size, and its storage cost easily increases excessively. For example, the data amount of video data obtained from a production line that operates 24 hours a day and 365 days a year is also enormous. Therefore, supposed that the data is stored as it is, the storage cost will increase as time elapses.

Such video data needs to be stored not only temporarily but also continuously for a period suitable for the life cycle of the produced product (for example, 10 years in the case of an automobile). In addition, such video data is also necessary to be searchable when needed (for example, during examination or when a problem occurs). If such conditions are combined, the storage cost easily increases more and more. In this regard, how to reduce the data amount in handling of the video data becomes an important issue.

In the related art (PTL 2), a technique of reducing the video data amount by converting the video data into restorable document data is disclosed. In addition, Patent Document 1 discloses a technique of detecting a point serving as a key of each frame on the basis of the video data for a device maintenance work or the like, indexing the points from the local characteristic amount, and dividing the video data into sections depending on the index.

Using the related art, it is expected to reduce the data. However, it is difficult to reduce the amount of the video data efficiently by the section linked with the meaning of the operation at the manufacturing site (such as meaning of the corresponding work or important check points). Furthermore, it is difficult to expect to obtain effects from the viewpoint of efficiently managing digital evidence in the form of capable of specifying necessary information as necessary.

It is therefore an object of the present invention to provide a technology capable of appropriately reducing the data amount of video data as digital evidence obtained from the manufacturing site in consideration of a form applicable to a predetermined use purpose.

In order to solve the above problem, one of the present inventions is a digital evidence management method executed by an information processing system comprising storing log data of a device operated in a predetermined process and video data shot in the process, specifying sectional video data regarding a time frame where the log data exists out of the video data, applying a predetermined data reduction processing to the sectional video data, and storing the video data subjected to the data reduction processing for the sectional video data in a storage device as digital evidence for the process.

A digital evidence management system according to the present invention comprises a storage device that stores log data of a device operated in a predetermined process and video data obtained by shooting the process, and a computing device that executes a processing of specifying sectional video data for a time frame where the log data exists out of the video data, a processing of applying a predetermined data reduction processing to the sectional video data, and a processing of storing the video data subjected to the data reduction processing for the sectional video data in the storage device as digital evidence for the process.

According to the present invention, it is possible to appropriately reduce the data amount of the video data as digital evidence obtained from a manufacturing site in consideration of a form applicable to a predetermined use purpose.

BRIEF DESCRIPTION OF DRAWINGS

FIG. 6 is a diagram illustrating a configuration example of a device log according to the present embodiment.

FIG. 7 is a diagram illustrating a configuration example of an original video data management table according to the present embodiment.

FIG. 8 is a diagram illustrating a configuration example of an evidence video data management table according to the present embodiment.

FIG. 9 is a diagram illustrating a configuration example of an evidence task management table according to the present embodiment.

FIG. 10 is a diagram illustrating a configuration example of a non-work video data handling rule table according to the present embodiment.

FIG. 11 is a diagram illustrating a configuration example of a work unit video data handling level table according to the present embodiment.

DESCRIPTION OF EMBODIMENTS

Network Configuration

Figure 1:
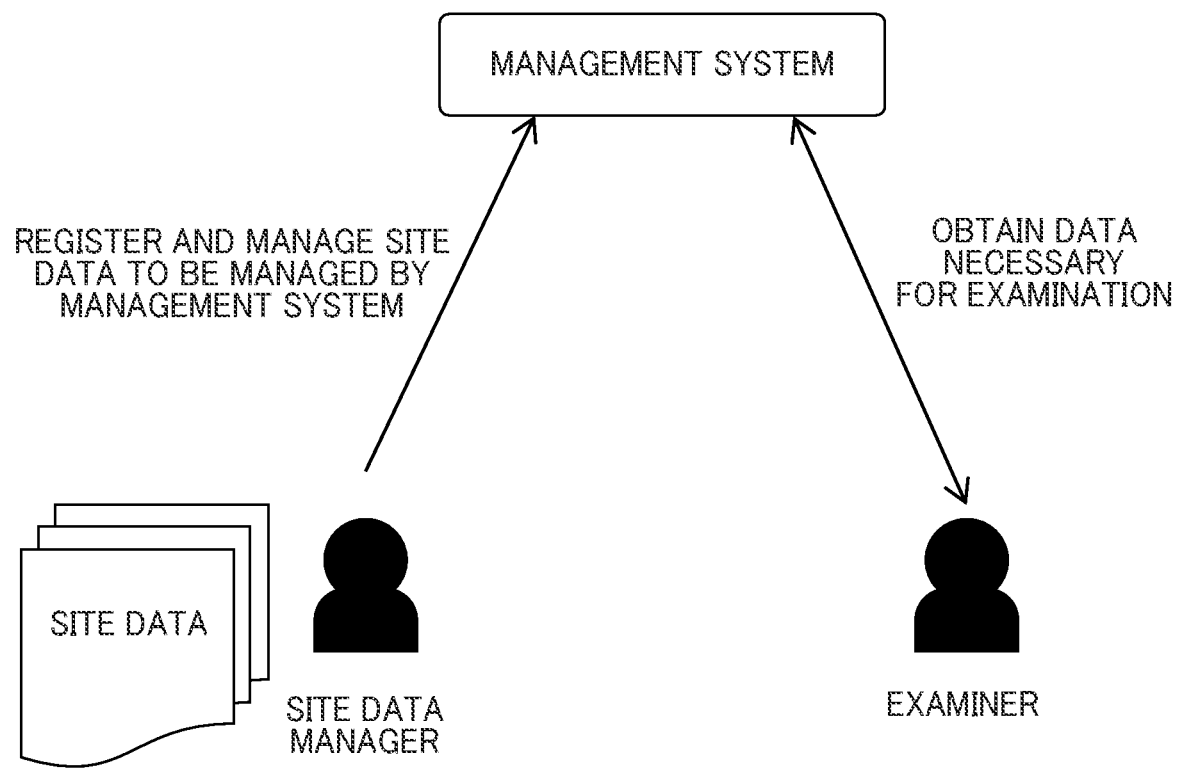
FIG. 1 is a diagram illustrating an example of a relationship when an on-site data manager and an examiner operate a management system according to the present embodiment.
Figure 2A:
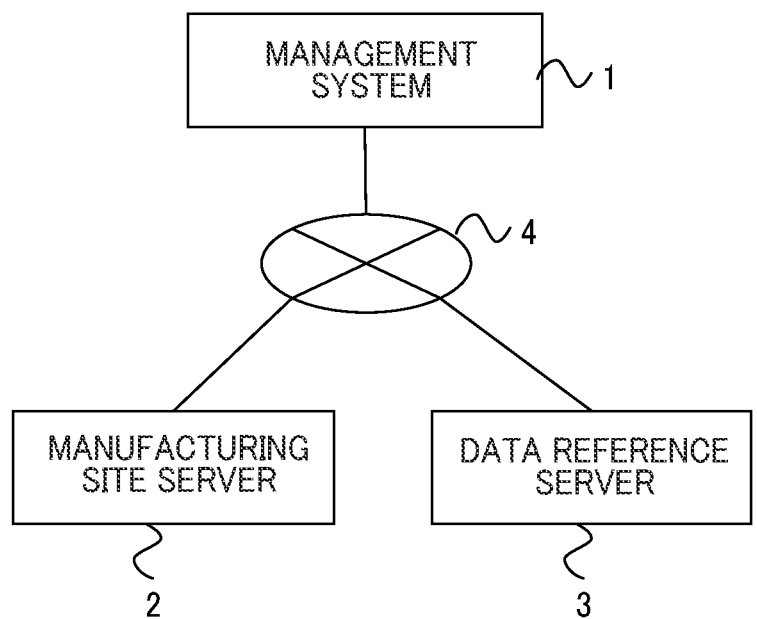
FIG. 2A is a diagram illustrating an example of a network configuration including the management system according to the present embodiment.

Embodiments of the present invention will now be described in details with reference to the accompanying drawings. FIG. 1 is a diagram illustrating an example of a relationship when an on-site data manager and an examiner operate a management system according to an embodiment, and FIG. 2A is a diagram illustrating an example of a network configuration including an evidence management system according to the present embodiment.

The relationship illustrated in FIG. 1 is based on assumption that, for example, log data or video data created in each process of product manufacturing in a supply chain are registered in the evidence management system (hereinafter, referred to as "management system 1"), and an examiner or the like browses the data. According to the present embodiment, the log data or video data described above are referred to as data obtained at the manufacturing site, that is, "site data".

Note that the log data or video data described above are obtained by observing each work of the process by using an IoT device, camera, or the like provided in each operation of each process.

FIG. 1 illustrates the aforementioned relationship by extracting only one of the processes in the supply chain for simplicity of explanation. In the supply chain, a plurality of processes may be connected, and a plurality of processes that create the site data illustrated in FIG. 1 may exist.

Even in one process, there may be a plurality of site data managers. For example, in a certain supply chain, there may be a first manufacturing process and a second manufacturing process, and each process may have a site data manager. Hereinafter, explanation will be given on the assumption that one process has one manufacturing process, and there is one site data manager who manages the manufacturing process.

Note that the site data manager is a person who takes charge of managing the aforementioned site data at the product manufacturing site in the supply chain.

Figure 2B:
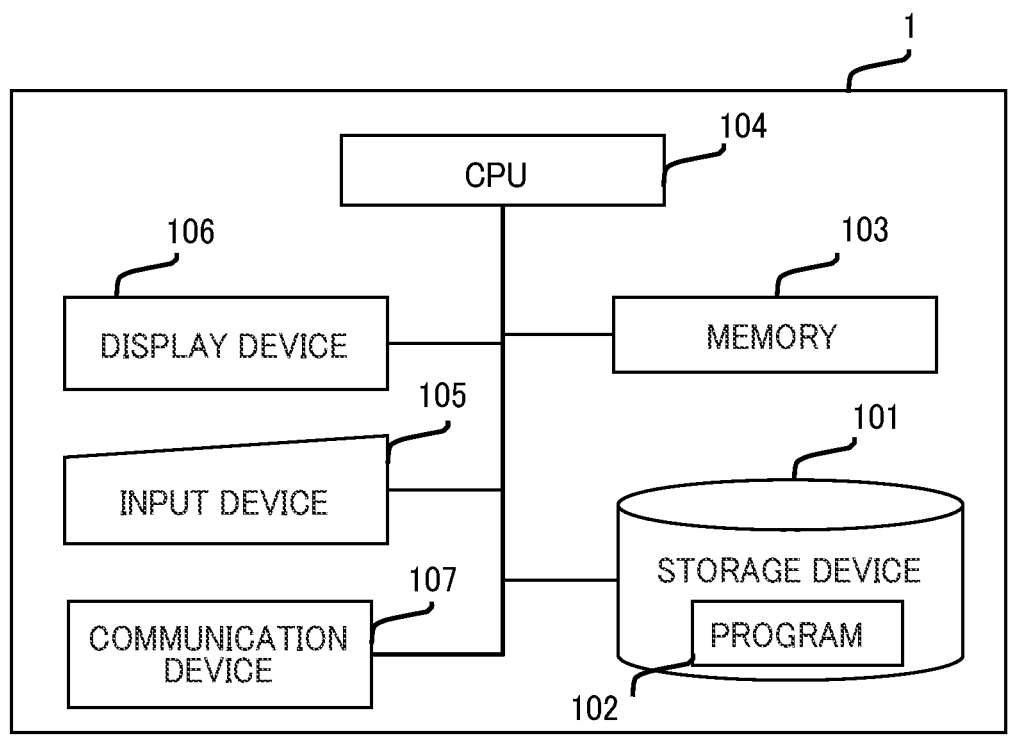
FIG. 2B is a diagram illustrating a hardware configuration example of the management system according to the present embodiment.

Such a site data manager transmits the aforementioned site data to the management system 1 via the network 4 and the manufacturing site server 2 illustrated in FIG. 2. Naturally, the manufacturing site server 2 may also obtain the site data from the IoT device or the camera and automatically transmit the data to the management system 1 via the network 4. Note that the site data manager performs a predetermined management manipulation for the site data registered in the management system 1 via the manufacturing site server 2.

Meanwhile, the examiner is a person who examines, for example, whether or not the product manufactured in the supply chain is produced in compliance with the regulations in the manufacturing process. This examiner accesses the management system 1 via the network 4 and refers to the digital evidence by using the data reference server 3.

Meanwhile, the management system 1 answers the digital evidence in response to a predetermined request (designation of the digital evidence necessary for the examination) based on the access from the data reference server 3.

Note that, in the manufacturing process, a plurality of facilities, that is, IoT devices or cameras may exist. For this reason, the manufacturing site server 2 of FIG. 2 may also exist in each facility. In addition, information on the plurality of facilities may also be managed integratedly.

Hardware Configuration

FIG. 2 illustrates a hardware configuration of the management system 1 described above. The management system 1 according to the present embodiment has a storage device 101, a memory 103, a computing device 104, an input device 105, a display device 106, and a communication device 107. Specifically, the management system 1 is a general server, a PC, or the like.

Among them, the storage device 101 is an appropriate non-volatile storage element such as an SSD (solid state drive) or a hard disk drive.

The memory 103 is a volatile storage element such as a RAM.

The computing device 104 is a CPU that executes a program 102 stored in the storage device 101 by reading it into the memory 103 or the like to perform integrated control of the apparatus itself and to perform various determinations, arithmetic operations, and control processings.

The input device 105 is a device such as a keyboard, a mouse, or a microphone that receives key input or voice input from a user.

The display device 106 is a device such as a display that displays a result of the processing of the computing device 104.

The communication device 107 may be a network interface card that is connected to the network 4 and performs a communication processing with other devices such as the manufacturing site server 2 and the data reference server 3.

Figure 3:
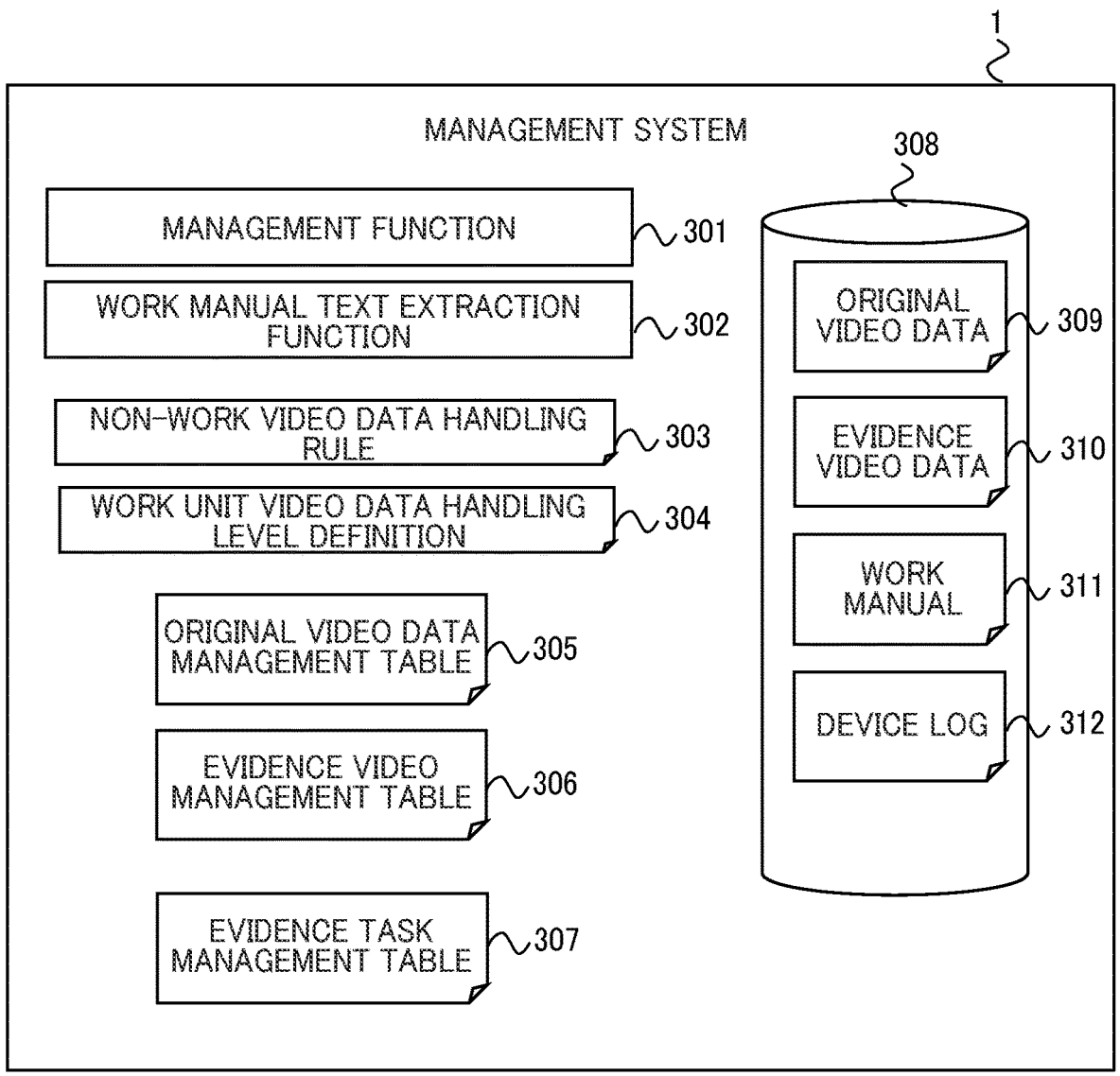
FIG. 3 is a diagram illustrating a configuration example of the management system according to the present embodiment.

Note that FIG. 3 illustrates an example of a function group, a data group, or a management table included in the management system 1 described above. The function group is implemented as the computing device 104 executes the program 102. In addition, it is assumed that the data group, the management table, or the like are stored in the storage device 101.

The management system 1 according to the present embodiment has a management function 301 and a work manual text extraction function 302.

Among them, the management function 301 is a function for creating evidence video data 310 for the original video data 309 stored in the database 308. Details of this function will be described below with reference to the flow and the like.

Meanwhile, the work manual text extraction function 302 is a function for extracting a caution or instruction described in the work manual 311 (information on the work regulations) stored in the database 308 in units of word.

In many cases, the work manual 311 is described in different formats or specifications for each company. The caution or instruction may be manually extracted, and a result of the extraction may be input to the management system 1. The function of extracting a word from a sentence may be based on a function of popular open source software (OSS).

Note that the aforementioned database 308 stores a device log 312 in addition to the original video data 309 (site data), the evidence video data 310, or the work manual 311 described above. This device log 312 corresponds to the log data of the device according to the present invention. Although it is assumed that such data are stored in the database 308, they may be managed as a file in a predetermined file system.

According to the present embodiment, it is assumed that the original video data 309 is transmitted from the manufacturing site server 2 to the management system 1. However, the original video data 309 may be stored in the manufacturing site server 2 and accessed by the management system 1 as necessary. This similarly applies to the evidence video data 310, the work manual 311, or the device log 312. In this case, the manufacturing site server 2 may temporarily transmit the site data to the management system 1 and receive the result after the processing on the management system 1 is terminated.

The management system 1 stores a non-work video data handling rule 303, a work unit video data handling level definition 304, an original video data management table 305, and an evidence task management table 306.

Among them, the non-work video data handling rule table 303 (specifically, see FIG. 10, details will be described below) is a table that defines how to handle the video data (sectional video data) to reduce a total amount of the video data for the video data of a certain task in the original video data 309. According to the present embodiment, it is assumed that the handling of video data is defined on a task type basis (FIG. 10). However, the handling may also be managed by fragmenting the task on a time basis.

Meanwhile, the work unit video data handling level definition table 304 (specifically, see FIG. 11, details will be described below) is a table that defines a level for handling video data on a task basis to further reduce the data from the video data (remaining sectional video data) where the total data amount has been reduced on the basis of the non-work video data handling rule 303 described above.

The management system 1 converts, for example, video data into text depending on this level. For text conversion, according to the present embodiment, it is assumed that the manager (site data manager) selects the words extracted by the work manual text extraction function 302 and creates the corresponding text. Meanwhile, text creation based on such word extraction processing may be systematized to automatically substitute the video data with, for example, words or sentences.

In addition to the text conversion, the data reduction means may include a processing for reducing a frame rate of the video, a processing for reducing a resolution of the video frame, a processing for reducing a canvas size, a processing for extracting only a specific part (angle of view) in the canvas by using video editing software disclosed by the OSS or the like.

Figure 4:
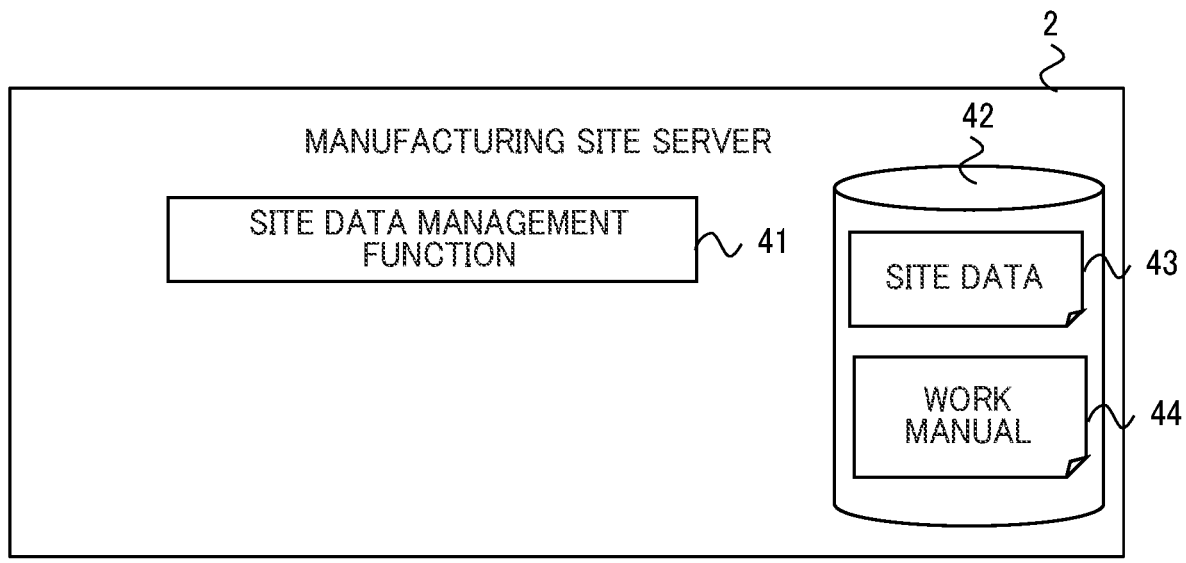
FIG. 4 is a diagram illustrating a configuration example of a manufacturing site server according to the present embodiment.

FIG. 4 is a diagram illustrating an example of the function or data stored in the manufacturing site server 2 according to the present embodiment. The manufacturing site server 2 according to the present embodiment includes a site data management function 41. In addition, the manufacturing site server 2 stores the site data 43 and the work manual 44 in the database 42. Such a manufacturing site server 2 is a general server or a PC, and its hardware configuration is basically the same as that of the management system 1 of FIG. 2B.

The site data management function 41 included in the manufacturing site server 2 is a function of registering the site data 43 stored in the database 42 to the management system 1. As described above, when the site data 43 or the work manual 44 is managed by the manufacturing site server 2 side, the site data management function 41 is responsible for such a management processing.

Here, the site data 43 is, for example, data created in the manufacturing operation of the manufacturing process in the supply chain. For example, the site data 43 includes data output by IoT device provided in a production line, video data shot by a camera or the like in a series of operations (a series of operation units indicated by a work or item) performed by a person in the manufacturing process, and the like.

However, in the present embodiment, explanation will be given by assuming that the site data 43 includes the device log output from the IoT device provided in the manufacturing process and the video data shot by the camera. In addition, although an example of the manufacturing site server 2 of FIG. 4 has both the site data management function 41 and the database 42, the database 42 may be arranged in NAS (Network Attached Storage) or the like and have a configuration different from that of the site data management function 41, and the site data 43 or the work manual 44 on the database 42 may be accessed via a network or the like.

Note that, similar to the manufacturing site server 2, the data reference server 3 is configured as a general server or PC, and its system configuration or the like will not be described.

Data Structure and Others

Figure 5:
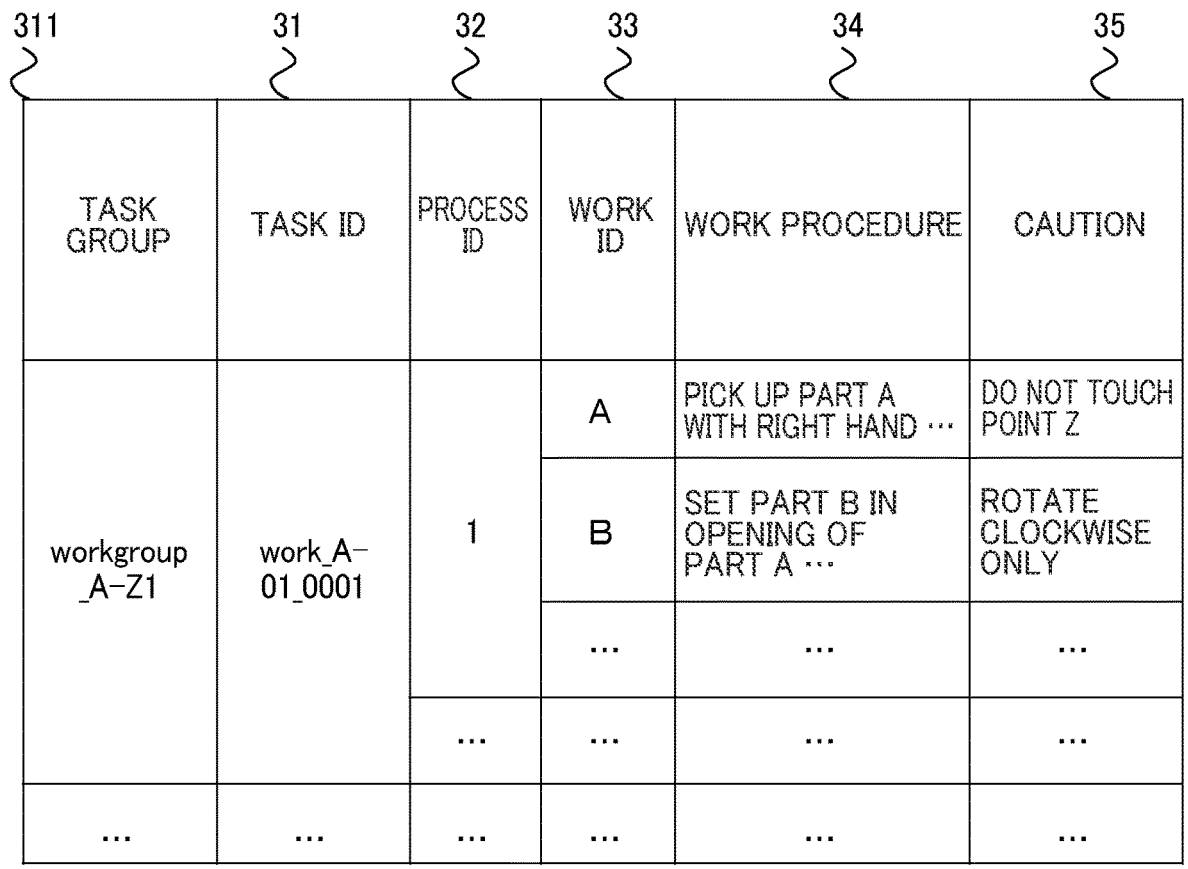
FIG. 5 is a diagram illustrating a configuration example of a work manual according to the present embodiment.

FIG. 5 is a diagram illustrating a configuration example of the work manual 311 according to the present embodiment. The work manual 311 is a file in which cautions or instructions regarding each work in the manufacturing process are described.

As illustrated in FIG. 5, the data structure includes, for example, a collection of records in which each value of the process ID, task ID, work procedure, and cautions is associated with each other by using the task group and the task ID as a key. Information such as images or videos may be contained in the data structure.

FIG. 6 is a diagram illustrating a configuration example of the device log 312 according to the present embodiment. The device log 312 according to the present embodiment is, for example, a log obtained by accumulating data observed by the IoT device in each manufacturing process.

As illustrated in FIG. 6, the data structure includes, for example, a collection of records in which each value of a process ID, a device ID of the IoT device provided at the manufacturing site corresponding to the process, a location where the IoT device is installed, log data obtained from the IoT device, and acquisition date/time of the log data is associated with each other by using the task group and the task ID as a key.

FIG. 7 is a diagram illustrating a configuration example of the original video data management table 305 according to the present embodiment. The original video data management table 305 stores information on the original video data 309. Among them, an identifier for identifying the original video data 309 is registered in the original video data ID column 51.

In the file path column 52, a file path for storing the original video data 309 in the management system 1 is registered. When the original video data 309 is stored in the database 308, an access path to the database 308 is registered.

In the file format column 53, a file format of the original video data 309 is registered. For example, "mp4" or the like is registered as a compression format name of the Mpeg standard.

In the shooting location column 54, an identifier of the location where the original video data 309 is shot is registered. In addition, in the start time column 55 and the end time column 56, a start time and an end time at which the original video data 309 is shot are registered.

FIG. 8 is a diagram illustrating a configuration example of the evidence video data management table 306 according to the present embodiment. In the evidence video data management table 306, information for managing the evidence video data 310 created by the management function 301 on the basis of the original video data 309 is registered.

Among them, in the evidence video data ID column 61, an identifier for identifying the evidence video data 310 is registered.

In the original video data ID column 62, an identifier for identifying the original video data 310 as a source of creating the evidence video data 310 is registered.

In the file path column 63, a file path for storing the evidence video data 310 in the management system 1 is registered. When it is stored in the database 308, an access path to the database 308 is registered.

In the file format column 64, a file format of the evidence video data 310 of the evidence video data 310 is registered.

In the start time column 65 and the end time column 66, a start time and an end time for shooting the evidence video data 310 are registered. The start time and the end time are times between the start time and the end time of the original video data 309 of the identifier registered in the original video data ID column 62.

FIG. 9 is a diagram illustrating a configuration example of the evidence task management table 307 according to the present embodiment. In the evidence task management table 307, information on the tasks for the evidence video data 310 managed by the evidence video data management table 306 described above is registered.

Among them, in the task ID column 701 and the task group column 702, a task group identifier and an identifier for identifying the task where the evidence video data 310 has been shot in the manufacturing operation of the manufacturing process as a shooting target of the evidence video data 310 are registered.

In the evidence video data ID column 703, an identifier of the evidence video data ID 61 of the evidence video data 310 registered in the evidence video data management table 306 described above is registered.

In the "Man" column 704, "Machine" column 705, "Method" column 706, "Material (input)" column 707, and "Material (output)" column 708, information on a person engaged in the task for shooting the evidence video data 310 in the manufacturing operation of the manufacturing process (for example, name of worker), device information, procedure information, and material information (input to the device and output of the device) are registered.

In the work location column 709, an identifier of the work location in the manufacturing operation of the manufacturing process is registered.

In the task start time column 710 and the task end time column 711, a start time and an end time for shooting the evidence video data 310 are registered.

In the example of the evidence task management table 307 of FIG. 9, a person "Man_A" performs a work "compress" using a device "compressor", a material (input) at that time is "MI_1," and a material (output) is "MO_1".

The evidence video data management table 306 of FIG. 8 and the evidence task management table 307 of FIG. 9 are handled as a set, and the detailed task contents of the table registration information of the evidence video data management table 306 are registered in the evidence task management table 307.

Note that the "Material (input)" column 707 and "Material (output)" column 708 described above may include, for example, a production lot number of the product or the like in addition to the above. In addition, the example of FIG. 9 shows an example of the task in a certain operation of the manufacturing process. For example, when there is no human resource in this process (no human work), there may be no registration content such as "Man" column 704.

Subsequently, FIG. 10 is a diagram illustrating a configuration example of the non-work video data handling rule table 303 according to the present embodiment. The non-work video data handling rule table 303 is a table that relates to the video data (sectional video data) of a certain task in the original video data 309 and describes how to handle the video data in order to reduce a total data amount of the original video data 309.

Among them, in the task group column 81 and the task ID column 82, a task group identifier and an identifier for identifying the task where the video data (sectional video data) is shot are registered.

In the handling rule column 83, an action for the original video data 309 (sectional video data) where the task identified by the identifier is shot is registered. For example, the action of FIG. 10 is "delete", which indicates that the original video data 309 (sectional video data) indicated by the task ID of the task group is to be deleted.

In this manner, by executing actions such as "delete" for each task of the original video data 309, it is possible to reduce the data amount of the evidence video data 310 remaining as evidence.

According to the present embodiment, a deletion processing is registered for the video data indicated by the task group 81 and the task ID 82, that is, for the sectional video data. However, in addition to such deletion processing, processings such as decreasing the frame rate of the video, lowering the resolution of the video frame, reducing the canvas size, and extracting only a specific part (angle of view) in the canvas may also be possible. Furthermore, the data may be stored as a separate file or stored in another server.

FIG. 11 is a diagram illustrating a configuration example of the work unit video data handling level table 304. The work unit video data handling level table 304 is a table that defines a level of handling the video data on a task basis in order to further reduce the data from the original video data 309 whose data amount has been reduced by deleting the sectional video data or the like on the basis of the aforementioned non-work video data handling rule 303.

Among them, in the task group column 91 and the task ID column 92, a task group identifier and an identifier for identifying the task where the video data is shot are registered.

In the handling level column 93 and the handling content column 94, a handling level for the evidence video data 310 obtained by shooting the task identified by the identifier and the action content thereof are registered. For example, FIG. 11 shows that the handling content is "documentation" at the handling level "low".

This shows that the evidence video data 310 indicated by the task ID of the task group has low importance, that is, the low handling level, and text substitution is performed. In this manner, it is possible to reduce the data amount of the video data by classifying the video data into levels on a task basis and executing the action such as text substitution.

According to the present embodiment, text conversion is registered for the video data indicated by the task group 91 and the task ID 92. In addition to the text conversion processing, for example, a processing such as decreasing the frame rate of the video, lowering the resolution of the video frame, reducing the canvas size, and extracting only a specific part (angle of view) in the canvas may also be performed. Furthermore, the data may also be stored as a separate file or stored in another server.

Note that the text conversion processing for the video data according to the present embodiment is, for example, a processing of creating text "perform a work Z for a range X-Y" on the basis of the work manual 311 for the video data of the work performed by an operator (person) in the manufacturing process for any specific range of the manufactured part. In this manner, when the work content can be clearly specified on the basis of the description of the work manual 311, the text conversion processing is useful.

However, it is difficult to expect sufficient accuracy even when text conversion is performed for the video data of the work which is based on the know-how of the operator and has no clear requirement specified in the work manual 311 (for example, evenly spraying an appropriate amount of paints on the manufactured part). In this case, it is useful to perform a data reduction processing such as decreasing the frame rate or the resolution while leaving the video data itself instead of text conversion.

Flow Example

An actual procedure of the digital evidence management method according to the present embodiment will now be described with reference to the accompanying drawings. Various operations corresponding to the digital evidence management method described below are realized by a program read by the management system 1 into a memory or the like and executed. In addition, the program contains codes for performing various operations described below.

By using Flow Examples 1 to 6 of FIGS. 12 to 18, processing flows for creating the evidence video data 310 on the basis of the original video data 309 or the work manual 311 by operating the management system 1 or the manufacturing site server 2 in cooperation will be described.

Transmission of Original Video Data

Figure 12:
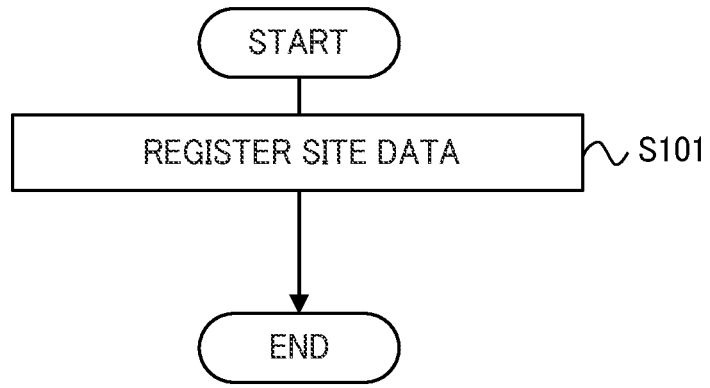
FIG. 12 is a diagram illustrating a flow example 1 of the evidence management method according to the present embodiment.

FIG. 12 illustrates an example of a processing flow performed by the manufacturing site server 2 according to the present embodiment to register the site data 43 in the management system 1. In this case, the manufacturing site server 2 transmits the site data 43 and the work manual 44 to the management system 1 in response to an instruction from the site data manager or arrival of a predetermined processing opportunity (step S101), and terminates the processing. The site data 43 includes device logs and video data.

Storing of Original Video Data

Figure 13:
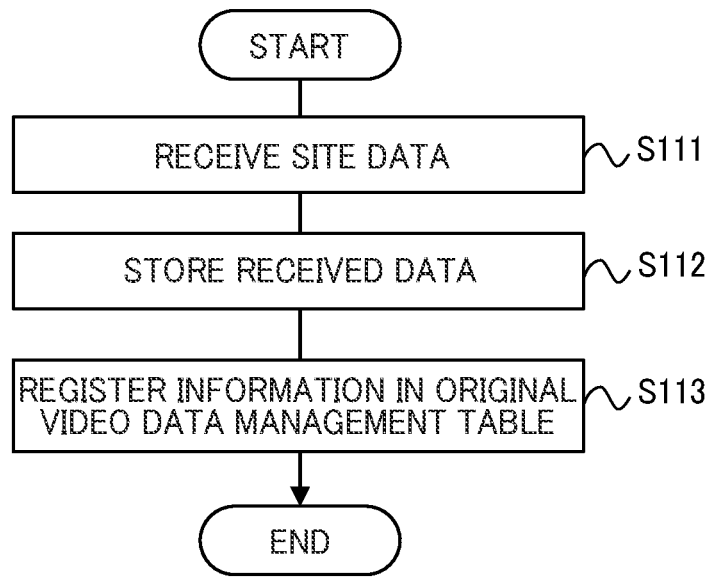
FIG. 13 is a diagram illustrating a flow example 2 of the evidence management method according to the present embodiment.

FIG. 13 is an example of a processing flow performed by the management system 1 according to the present embodiment to receive the site data 43 from the manufacturing site server 2 and store the site data 43.

In this case, the management system 1 receives the site data 43 and the work manual 44 from the manufacturing site server 2 described above (step S111).

The management system 1 stores the video data of the site data 43 received in S111 in the original video data 309 of the database 308, and stores the device logs in the device log 312 of the database 308 (step S112).

The management system 1 of step S112 stores the work manual 44 obtained from the manufacturing site server 2 as the work manual 311 of the database 308.

The management system 1 registers corresponding information in the original video data column 51, the file path column 52, the file format column 53, the start time column 55, and the end time 56 of the original video data management table 305 as information regarding the original video data 309 described above (step S113), and terminates the processing. The information registered here by the management system 1 is based on property information or the like of the original video data 309.

Information Registration to Original Video Data Management Table

Figure 14:
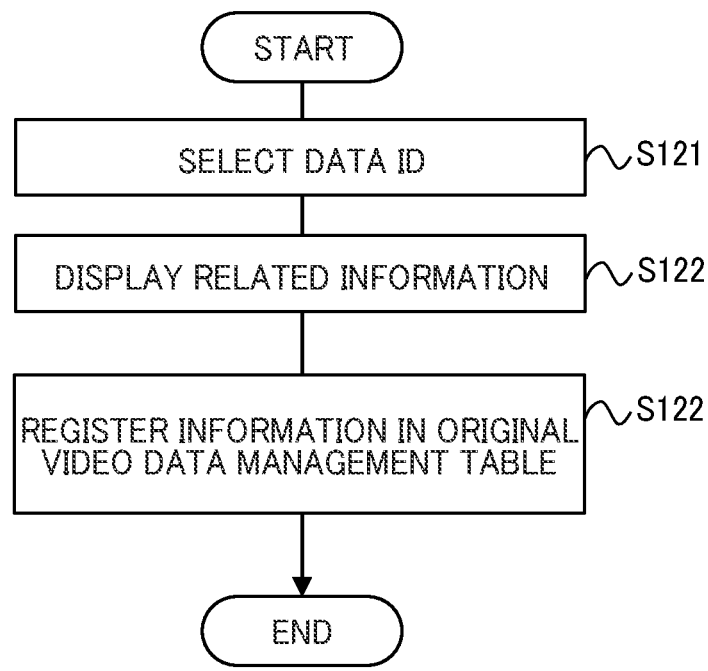
FIG. 14 is a diagram illustrating a flow example 3 of the evidence management method according to the present embodiment.

Subsequently, FIG. 14 illustrates an example of the processing flow performed by the management system 1 according to the present embodiment to register related information of the original video data original video data 309 obtained in the steps S111 and S112 described above.

In this case, first, the management system 1 selects the original video data 309 to be processed on the basis of a predetermined rule such as a user instruction or a date order (step S121).

Next, the management system 1 displays the information already registered in the original video data management table 305 for the original video data 309 selected in S121 (step S122). This information may be those registered in S113 described above.

Then, the management system 1 receives unregistered information, such as the input of the shooting location column 54, for example, from the information site data manager for the original video data 309 whose information is displayed in S122, and updates the information in the original video data management table 305 on the basis of the received information (step S123). The information regarding the shooting location may be included in the property information of the video data, and in this case, this flow is unnecessary.

Data Amount Reduction

Figure 15:
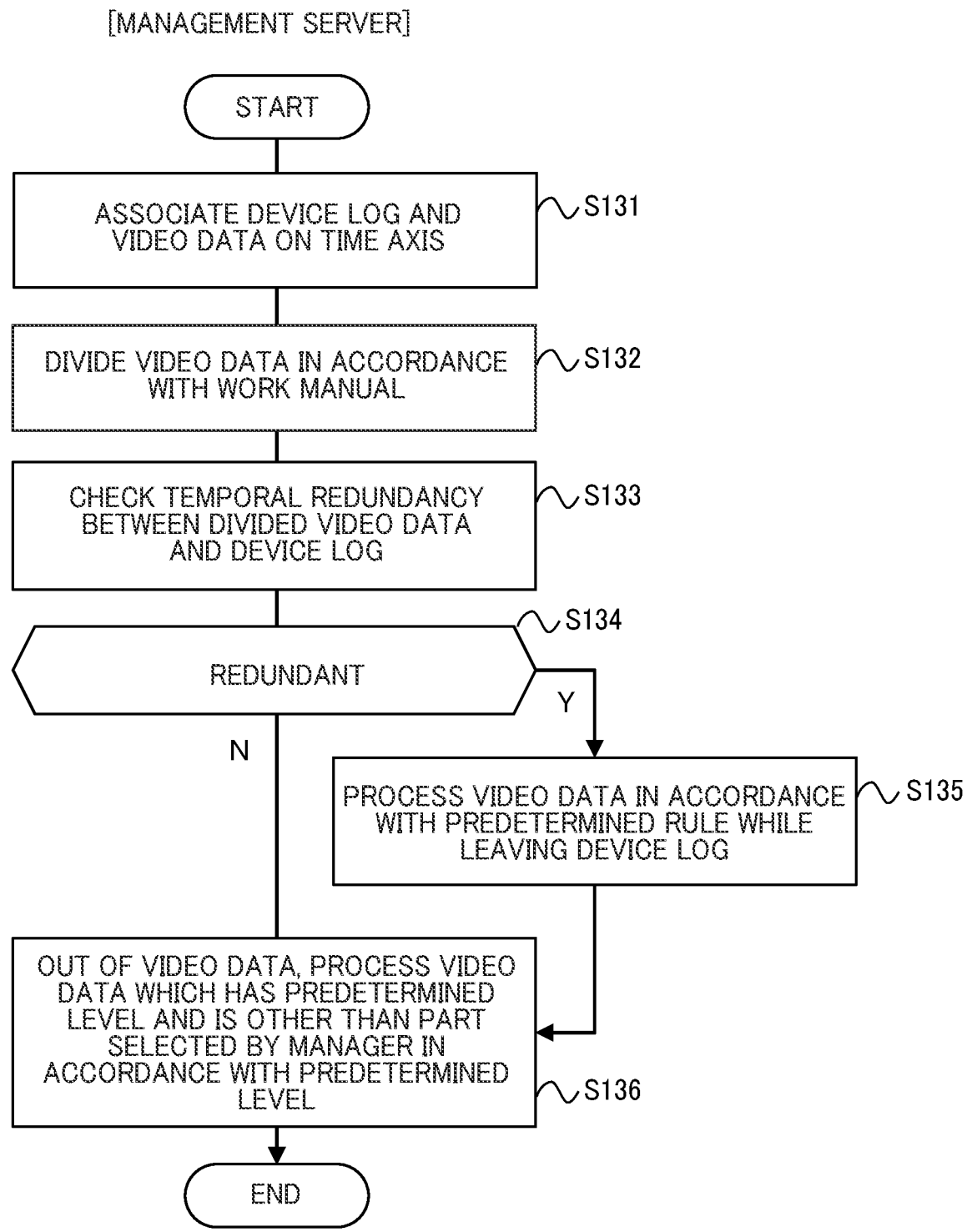
FIG. 15 is a diagram illustrating a flow example 4 of the evidence management method according to the present embodiment.

FIG. 15 is an example of a processing flow performed by the management system 1 according to the present embodiment to create evidence video data 310 on the basis of the original video data 309 by appropriately reducing the data amount.

In this case, first, the management system 1 performs time-based matching between the original video data 309 indicated by the record in the original video data management table 305 and the record of the device log 312, and stores the records of the same time frame, that is, the original video data 309 and the device log 312 in the memory 103 by associating them with each other (step S131).

In the case, the matching is performed between the value of the shooting location column 54 of one record in the original video data management table 305 (for example, unprocessed records in the table expressed in the ascending/descending order of the original video data ID) and the value of the location column 44 in the records of the device log 312.

The information for determining whether or not the records are in the same time frame on the basis of the matching includes the time frames indicated by the start time column 55 and the end time 56 in the corresponding records of the original video data management table 305 and the time frame indicated by the value of the acquisition date/time 46 of the corresponding record in the device log 312.

Through the processings described hereinbefore, it is possible to specify a relationship between original video data and the device log, obtained in the same time fame for the same location, that is, the same process or work.

Subsequently, the management system 1 divides the original video data 309 associated with the device log 312 in S131 on the basis of the work manual 311 (step S132).

Note that this step assumes a situation in which the site data manager performs the processing in cooperation with the management function 301 of the management system 1 via the manufacturing site server 2. The specific processing contents will be described below with reference to FIGS. 17 and 18.

Figure 17:
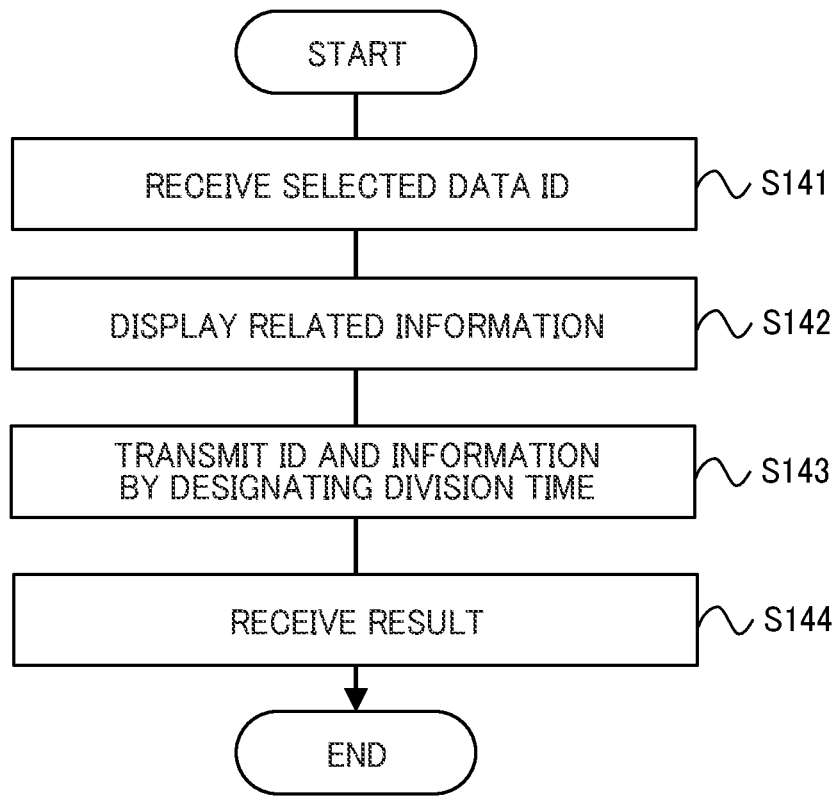
FIG. 17 is a diagram illustrating a flow example 5 of the evidence management method according to the present embodiment.

FIG. 17 illustrates a flow example when the site data manager instructs to divide the video data on the basis of the work manual 311 in the data amount reduction processing for the video data.

First, the manufacturing site server 2 receives a selection manipulation for the original video data 309 as a target from the site data manager (step S141). In this case, the manufacturing site server 2 obtains a list of the original video data 309 stored in the original video data management table 305 from the management system 1 and displays it in a selectable manner. Alternatively, the selection manipulation may be performed by obtaining the information on the original video data 309 as a processing target of S132 from the management system 1, displaying the information, and receiving confirmation from the site data manager.

Subsequently, the manufacturing site server 2 displays the related information on the video data selected by the site data manager in step S141 described above or the video itself (step S142). Here, the information or video regarding the corresponding original video data 309 in the original video data management table 305 is displayed.

Then, the manufacturing site server 2 receives, from the site data manager, each designation of the start time and the end time as a range for classifying the original video data 309 whose information is displayed in S142 for each task, process, or work and transmits the designations and the ID of the original video data 309 to the management system 1 (step S143). In this case, the site data manager browses the information on the process or work of each task in the work manual 311 and specifies the video of the corresponding time frame as the video data of the corresponding process or the corresponding work of the corresponding task when the corresponding content is performed by a person.

The information transmitted here defines a part of the original video data 309 obtained by the division of S132 described above, that is, the video data for each task, process, or work.

A validity of the work (whether or not the work procedure 34 and cautions 35 specified in the work manual 311 are observed) may also be designated by the site data manager.

The manufacturing site server 2 receives a predetermined response (example: a reply message for acknowledgement) associated with the transmission in S143 from the aforementioned management system 1 (step S144), and terminates the processing.

Although a time-based designation method is described in step S143 in this flow, designation methods based on other criteria may also be employed. In addition, in the present embodiment, it is assumed that, in the division of the original video data 309 in step S143, for example, comparison (such as vector comparison) is applied between teacher video data fragmented on a task, process, or work basis (corresponding to the video performed by a person in compliance with the work sequence or cautions defined in the work manual 311) and the original video data 309 regarding the corresponding task, process, or work, so that the corresponding task is determined when the difference is within a predetermined range.

Figure 18:
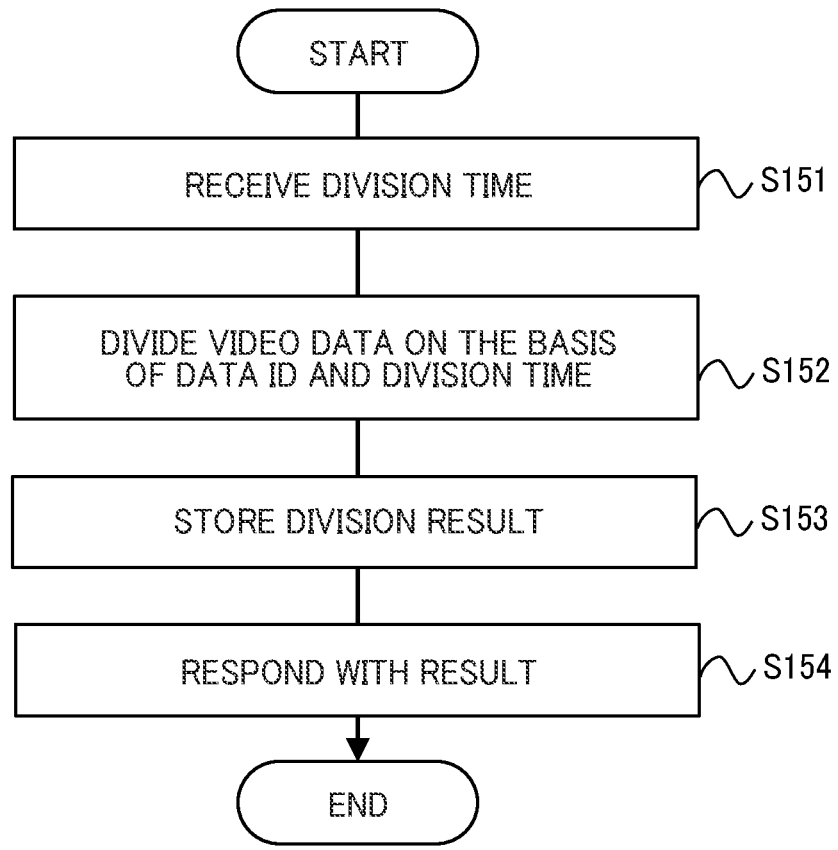
FIG. 18 is a diagram illustrating a flow example 6 of the evidence management method according to the present embodiment.

Subsequently, FIG. 18 illustrates a flow example in which the management system 1 according to the present embodiment receives the division instruction of FIG. 17 and executes the division processing of the original video data 309 on the basis of the received content.

In this case, the management system 1 receives, from the manufacturing site server 2, the division time (start time and end time) and the identifier (original video data ID) that define the video data corresponding to the task, process, and work described above (step S151).

The management system 1 divides the target original video data 309 into video data corresponding to the aforementioned work or the like on the basis of the division time or the like received in the aforementioned step S151 (step S152). Through this processing, the original video data 309 is sectioned into video data of each work (example: work A to work E) on the time axis (see FIG. 16A).

Note that, although the division processing of step S152 assumes the use of the division application provided by OSS, the division processing may also be performed using a different unique method.

The management system 1 stores the original video data 309 subjected to the division processing in step S152 (the video data sectioned on a work basis) as the evidence video data 310 (step S153).

Finally, the management system 1 responds to the manufacturing site server 2 with a processing result (example: a message that the original video data 309 has been sectioned to each video for the works A to F of the X process of the XX task) (step S154), and terminates the processing.

Here, returning to the flow of FIG. 15, subsequently, the management system 1 receives a result (FIG. 16A) of dividing the original video data 309 in units of task processing (example: work) on the time axis, and performs a repeated check between the original video data 309 and the device log 312 subjected to the division on the time axis by using the matching result of step S131 and the division result of step S132 (step S133).

Figure 16A:
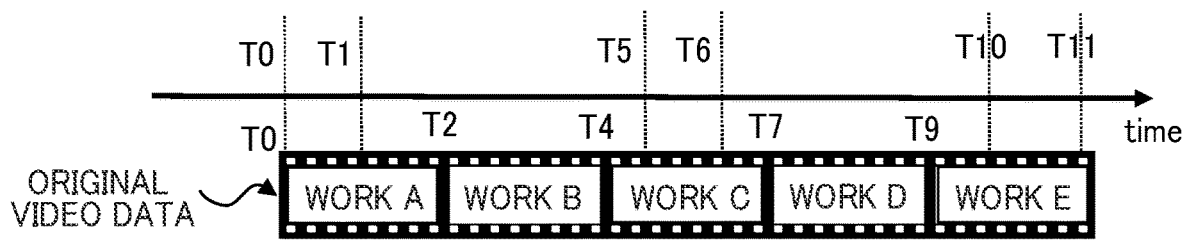
FIG. 16A is a diagram illustrating a conceptual example of video division according to the present embodiment.
Figure 16B:
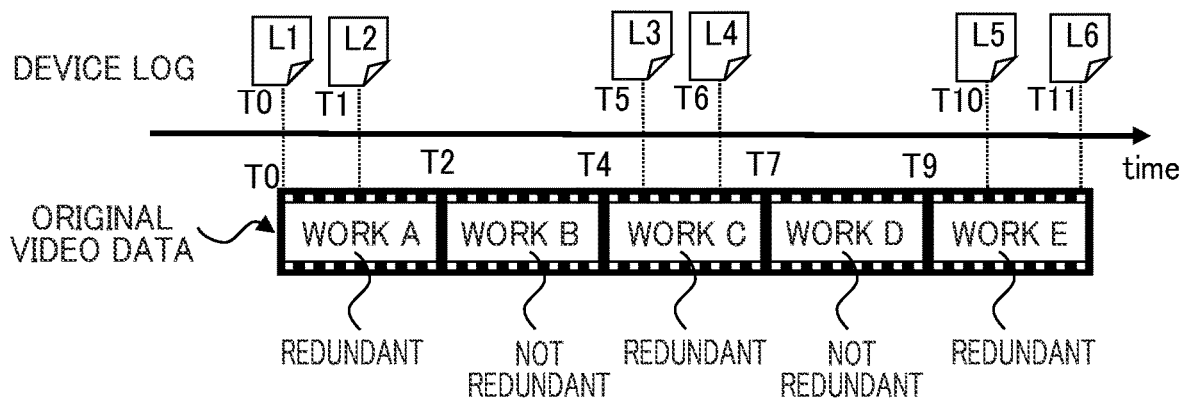
FIG. 16B is a diagram illustrating an example of a concept regarding redundancy between video data and device logs according to the present embodiment.
Figure 16C:
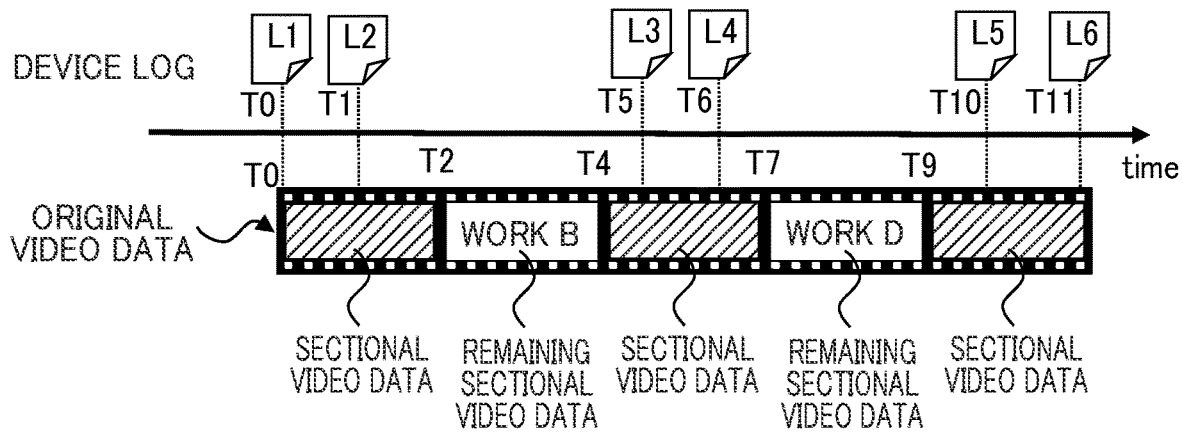
FIG. 16C is a diagram illustrating a conceptual example of sectional video data and remaining sectional video data according to the present embodiment.

In the example of FIG. 16B, the original video data 309 is sectioned to each video data for the work A at time T0 to T2, work B at time T2 to T4, work C at time T4 to T7, work D at time T7 to T9, and work E at time T9 to T11. Meanwhile, it is assumed that L1 to L6 are obtained as the device log 312 between the time axes T0 to T11.

Note that the device log L1 is obtained for time T0. In addition, the device log L2 is obtained for time T1. In addition, the device log L3 is obtained for time T5. In addition, the device log L4 is obtained for time T6. In addition, the device log L5 is obtained for time T10. In addition, the device log L6 is obtained for time T11.

Therefore, the management system 1 determines whether or not the device log 312 and the video data for each section of the original video data 309 are redundant with respect to the time axis as described above. Here, the redundancy means that the data belong to the same time frame. In the redundancy relationship according to the present embodiment, when the original video data and the device log exist in the corresponding time frame, they are regarded as synonymous data, and it is assumed that, for example, a situation of reading from the original video data coincides with a situation of reading from the device log. Therefore, when the original video data and the device log exist in the time frame of redundancy, it is conceived that a processing for storing only the device log and deleting the original video data can be performed.

In the situation of FIG. 16B, it is determined that the video data of work A of the time frame T0 to T2 are redundant with the device logs L1 and L2, the video data of work B of the time frame T2 to T4 is not redundant with the device log, the video data of work C of the time frame T4 to T7 are redundant with the device logs L3 and L4, the work D of the time frame T7 to T9 is not redundant with the device log, and the video data of work E of the time frame T9 to T11 are redundant with the device logs L5 and L6.

If a redundancy relationship is identified as a result of the aforementioned redundancy check (S134: Y), the management system 1 executes a processing such as deleting the video data part of the corresponding work having a redundancy relationship with the device log 312 depending on the value of the handling rule 83 defined for the video data of the task group and the task ID (the value is obtained from the corresponding device log 312) in the non-work video data handling rule table 303 (step S135).

In this case, the management system 1 stores the original video data 309 subjected to this processing, that is, the original video data 309 (including the remaining sectional video data) in which the video data of the corresponding work has been deleted, as the evidence video data 310 in the database 308, and advances the processing to step S136.

Meanwhile, if no redundancy relationship is identified as a result of the redundancy check described above (S134: N), or after the processing of step S135 is terminated, the management system 1 executes a processing such as text conversion or frame rate reduction for the target data depending on the handling level 93 of the column, where the task type (task ID and task group) of the target data registered in the work unit video data handling level table 304 matches, and the processing content of the handling content 94 (step S136). Then, the processing result is stored as the evidence video data 310, and the processing is terminated.

Note that the aforementioned target data corresponds to the evidence video data 310 when the evidence video data 310 exists through the execution of S135. Meanwhile, when such evidence video data 310 does not exist, the target data corresponds to the original video data 309 used as the processing target by S133.

In step S136 described above, the processing result is stored as the evidence video data 310. However, in steps S135 and S136, when the divided video data is processed (for example, deletion or text conversion) in compliance with the rules, the corresponding row of the evidence video management table 306 changes the entry of the file format 64 into text or deleted (for example, "-" notation).

By executing the flow of FIG. 15, for example, the video data obtained in one operation of the manufacturing process in the supply chain is divided for each procedure on the basis of the manual or the like. In addition, a processing (such as deletion) based on a predetermined rule is performed when there is a device log 312 of the same time frame in the divided video data, that is, there is a redundancy relationship with the device log 312 on the time axis, so that a total amount (size) of the video data in the first stage is reduced (decrease).

Reduction (decrease) of the total amount (size) of the video data in the second stage can be realized, for example, by performing text conversion for the individual video data obtained as a result of the processing of the first stage (each remaining sectional video data remaining after the processing such as deletion among the video data sectioned by division).

As a result, while the original video data 309 having originally a large data size is reduced to an appropriate data size, it can be used, for example, to guarantee reliability in the manufacturing process of the supply chain (that the manufacturing has been performed reliably in compliance with the work procedure sheet or the manual).

Note that the predetermined rules (such as the non-work video data handling rule 303 or the work unit video data handling level definition 304) used in the processing of the first or second stage described above (in step S135 or S136) may be registered by the site data manager in advance. Alternatively, the processing of the first or second stage may be executed while the site data manager checks the actual video data. Alternatively, a third party other than the site data manager may specify the predetermined rule.

According to the present embodiment, it is assumed that the processing of the first or second stage (step S135 or S136) is executed after certification is obtained from a third party organization or the like. For this reason, execution of the processing does not impair the reliability of the video data itself, and the video data can be used for the purpose of examination or the like even after the processing flow of FIG. 15 is executed.

According to the present embodiment, it is assumed that the processing flow of FIG. 15 is executed by the management system 1. However, the video data, the device log, or the like serving as a target may exist not in the management system 1 but in the manufacturing site server 2. In this case, the processing flow of FIG. 15 or the like may be executed by the manufacturing site server 2. In this case, it is conceived that the processing result is stored from either the manufacturing site server 2 or the management system 1.

Note that, as illustrated in FIG. 3, it is assumed that the management system 1 according to the present embodiment has a form in which video data is converted into text in accordance with the work manual. However, in the processing flow of FIG. 15, when a processing other than text conversion (for example, a case where the frame rate of the video data is reduced, a case where the resolution of the video frame is reduced, or the like) is performed, the management system 1 may have a function of handling this processing.

For example, in the processing of text substitution (text conversion) of video data executed in step S136 described in this embodiment, presentation to the site data manager is performed on the basis of word-based words extracted by the work manual text extraction function 302 provided in the management system 1. By this presentation, the site data manager performs a processing such as word selection or word correction, and uses its result as the result of the text conversion processing.

Through the aforementioned flow, the video of the original video data 309 is divided depending on the task content, and a processing such as deletion or text conversion is performed in accordance with the rules specified in the content (task, process, or work).

As a result, the evidence video data 310 whose data size is significantly smaller than that of the original video data 309 is stored. How much the data amount is reduced from the original video data 309 depends on provisions of the non-work video data handling rule 303 or the work unit video data handling level 304.

Note that the evidence video data 310 is stored divisibly on a task basis. In addition, the evidence video data 310 may be distinguished on a product basis by including the production lot number or the like. This makes it easy to collect evidence on a task or product basis during the examination.

While the best modes for embodying the present invention have been described in details hereinbefore, they are not intended to limit the invention, but various changes may be possible without departing from the spirit and scope of the invention.

According to the present embodiment described above, it is possible to store and utilize the video data obtained by shooting each operation of the process involving human resources with a camera or the like in each process of the supply chain by sectioning the video data in conjunction with the meaning of the site. In addition, among video data, data unnecessary for the use purpose such as examination can be deleted or reduced. In addition, by substituting the video data with the cautions or instructions described in the work manual or the work standard, that is, by converting the video data into text, it is possible to effectively reduce the data amount of the video data other than the deletion target.

That is, it is possible to appropriately reduce the data amount of the video data as digital evidence obtained from the manufacturing site in consideration of a form applicable to a predetermined use purpose.

The description herein clarifies at least the following facts. That is, in the digital evidence management method according to the present embodiment, the information processing system may apply, as a data reduction processing for the sectional video data, at least one of deleting the sectional video data, reducing the frame rate, reducing the canvas size, and extracting only a specific part of the canvas.

As a result, it is possible to appropriately reduce the data amount of the video data as digital evidence obtained in the manufacturing site in consideration of a form applicable to a predetermined use purpose.

In the digital evidence management method according to the present embodiment, the information processing system may create the digital evidence by applying a predetermined data reduction processing to the remaining sectional video data other than the sectional video data of the video data described above and store the digital evidence in the storage device.

As a result, it is possible to more appropriately reduce the data amount of the video data as digital evidence obtained in the manufacturing site in consideration of a form applicable to a predetermined use purpose.

In the digital evidence management method according to the present embodiment, the information processing system may apply at least one of processings of extracting data for only a predetermined time frame, text conversion, reducing the frame rate, reducing the canvas size, and extracting only a specific part of the canvas as the data reduction processing for the remaining sectional video data.

As a result, it is possible to further appropriately reduce the data amount of the video data as digital evidence obtained from the manufacturing site in consideration of a form applicable to a predetermined use purpose.

In the digital evidence management method according to the present embodiment, the information processing system may further store information on the work regulations of the process in the storage device, extract a description of the work characteristics from the information on the work regulations regarding the work corresponding to the remaining sectional video data as a processing for the text conversion, and creates the extracted description as the digital evidence.

As a result, the text conversion of the video data becomes efficient, and it is possible to more appropriately reduce the data amount of the video data as digital evidence obtained from the manufacturing site in consideration of a form applicable to a predetermined use purpose.

In the digital evidence management method according to the present embodiment, the information processing system may execute each of processings of further storing information on the work regulations of the process in the storage device, storing the video data by dividing them in units of work of the process indicated by the information on the work regulations, specifying the sectional video data for each work unit, applying the data reduction processing, and storing the digital evidence.

As a result, it is possible to create and manage digital evidence in units of work, and further appropriately reduce the data amount of the video data as digital evidence obtained from the manufacturing site in consideration of a form applicable to a predetermined use purpose.

In the digital evidence management method according to the present embodiment, the information processing system may store the digital evidence by associating the digital evidence with information on at least one of the process, work, and product as a task target, indicated by the information on the work regulation referenced in creation of the digital evidence, search the digital evidence in the storage device in response to a digital evidence search request from a predetermined terminal on the basis of at least one of items of the process, work, and product as a search target indicated by the search request, and reply to the terminal with the digital evidence as a search result.

As a result, it is possible to accurately respond to the search request for the digital evidence.

In the digital evidence management system according to the present embodiment, the computing device may apply at least one of processings of deleting the sectional video data as the data reduction processing for the sectional video data, reducing the frame rate, reducing the canvas size, and extracting only a specific part of the canvas.

In the digital evidence management system according to the present embodiment, the computing device may create the digital evidence by applying a predetermined data reduction processing to the remaining sectional video data other than the sectional video data of the video data described above and store the digital evidence in the storage device.

In the digital evidence management system according to the present embodiment, the computing device may apply, as the data reduction processing for the remaining sectional video data, at least one of processings of extracting only a predetermined time frame, text conversion, reducing the frame rate, reducing the canvas size, and extracting only a specific part of the canvas.

In the digital evidence management system according to the present embodiment, the storage device may further store information on the work regulations of the aforementioned process, and the computing device may, as the text conversion processing described above, extract a description of the work characteristics from the information on the work regulations regarding the work corresponding to the remaining sectional video data and create the extracted description as the digital evidence.

In the digital evidence management system according to the present embodiment, the storage device may further store the information on the work regulations of the aforementioned process, and the computing device may execute each of processings of storing the video data by dividing the data in units of work of the process, indicated by the information on the work regulations, specifying the sectional video data for each work unit, applying the data reduction processing, and storing the digital evidence.

In the digital evidence management system according to the present embodiment, the computing device may store the digital evidence by associating the digital evidence with information on at least one of the process, work, and work target product, indicated by the information on the work regulations referenced in creation of the digital evidence, search the digital evidence from the storage device in response to a digital evidence search request from a predetermined terminal on the basis of at least one of items of the process, work, and product as a search target indicated by the search request, and reply to the terminal with the digital evidence as a search result.

REFERENCE SIGNS LIST 1 digital evidence management system
2 manufacturing site server
3 data reference server
4 network
41 site data management function
42 database
43 site data
44 work manual
101 storage device
102 program
103 memory
104 CPU (computing device)
105 input device
106 display device
107 communication device
301 management function
302 work manual text extraction function
303 non-work video data handling rule table
304 work unit video data handling level definition table
305 original video data management table
306 evidence video data management table
307 evidence task management table
308 database
309 original video data
310 evidence video data
311 work manual
312 device log

The invention claimed is:

1. A digital evidence management method executed by an information processing system, the method comprising:
   storing log data of a device operated in a predetermined process and video data shot in the process;
   specifying sectional video data regarding a time frame where the log data exists out of the video data;
   applying a predetermined data reduction processing to the sectional video data; and
   storing the video data subjected to the data reduction processing for the sectional video data in a storage device as digital evidence for the process.

2. The digital evidence management method according to claim 1, wherein
   the data reduction processing for the sectional video data includes at least one of processings of deleting the sectional video data, reducing a frame rate, reducing a canvas size, and extracting only a specific part of a canvas.

3. The digital evidence management method according to claim 1, further comprising:
   creating the digital evidence by applying a predetermined data reduction processing to remaining sectional video data other than the sectional video data out of the video data; and
   storing the digital evidence in the storage device.

4. The digital evidence management method according to claim 3, wherein
   the data reduction processing for the remaining sectional video data includes at least one of processings of extracting data for only a predetermined time frame, text conversion, reducing a frame rate, reducing a canvas size, and extracting only a specific part of a canvas.

5. The digital evidence management method according to claim 4, further comprising:
   further storing information on work regulations of the process in the storage device; and
   as the text conversion processing, extracting a description for work characteristics from the information on the work regulations regarding the work corresponding to the remaining sectional video data and creating the extracted description as the digital evidence.

6. The digital evidence management method according to claim 1, further comprising:
   further storing information on work regulations of the process in a storage device; and
   executing each of processings of storing the video data by dividing the data in units of work of the process indicated by the information on the work regulations, specifying the sectional video data for each work unit, applying the data reduction processing, and storing the digital evidence.

7. The digital evidence management method according to claim 6, further comprising:
   storing the digital evidence by associating the digital evidence with information on at least one of a process, a work, and a work target product, indicated by the information on the work regulations referenced in creation of the digital evidence;
   searching, in response to a digital evidence search request from a predetermined terminal, the digital evidence from the storage device on the basis of at least one of items of a process, a work, and a product as a search target indicated by the search request; and
   replying to the terminal with the digital evidence as a search result.

8. A digital evidence management system comprising:
   a storage device that stores log data of a device operated in a predetermined process and video data obtained by shooting the process; and
   a computing device that executes a processing of specifying sectional video data for a time frame where the log data exists out of the video data, a processing of applying a predetermined data reduction processing to the sectional video data, and a processing of storing the video data subjected to the data reduction processing for the sectional video data in the storage device as digital evidence for the process.

9. The digital evidence management system according to claim 8, wherein
   the computing device applies, as the data reduction processing for the sectional video data, at least one of processings of deleting the sectional video data, reducing a frame rate, reducing a canvas size, and extracting only a specific part of a canvas.

10. The digital evidence management system according to claim 8, wherein
    the computing device creates the digital evidence by applying a predetermined data reduction processing to remaining sectional video data other than the sectional video data out of the video data and stores the digital evidence in the storage device.

11. The digital evidence management system according to claim 10, wherein
    the computing device applies at least one of processings of extracting data for only a predetermined time frame, text conversion, reducing a frame rate, reducing a canvas size, and extracting only a specific part of a canvas, as the data reduction processing for the remaining sectional video data.

12. The digital evidence management system according to claim 11, wherein
the storage device further stores information on work regulations of the process in the storage device, and
the computing device extracts a description of work characteristics from the information on the work regulations regarding a work corresponding to the remaining sectional video data, as the text conversion processing, and creates the extracted description as the digital evidence.

13. The digital evidence management system according to claim 8, wherein
the storage device further stores information on work regulations of the process in the storage device, and
the computing device stores the video data by dividing the data in units of work of the process indicated by the information on the work regulations, and executes each of processings of specifying the sectional video data for each work unit, applying the data reduction processing, and storing the digital evidence.

14. The digital evidence management system according to claim 13, wherein
the computing device:
stores the digital evidence by associating the digital evidence with information on at least one of a process, a work, and a work target product indicated by the information on the work regulations referenced in creation of the digital evidence,
searches, in response to a digital evidence search request from a predetermined terminal, the digital evidence from the storage device on the basis of at least one of items of a process, a work, and a product as a search target indicated by the search request, and
replies to the terminal with the digital evidence as a search result.

* * * * *